(12) United States Patent
Schutz et al.

(10) Patent No.: US 10,300,547 B2
(45) Date of Patent: May 28, 2019

(54) TORCH CUTTING MACHINE

(71) Applicant: TMS International Corporation, Glassport, PA (US)

(72) Inventors: Timothy G. Schutz, Grafton, OH (US); Joseph H. Jung, Mason, OH (US)

(73) Assignee: TMS International Corporation, Glassport, PA (US)

( * ) Notice: Subject to any disclaimer, the term of this patent is extended or adjusted under 35 U.S.C. 154(b) by 361 days.

(21) Appl. No.: 15/244,481

(22) Filed: Aug. 23, 2016

(65) Prior Publication Data

US 2017/0056997 A1  Mar. 2, 2017

Related U.S. Application Data

(60) Provisional application No. 62/209,475, filed on Aug. 25, 2015.

(51) Int. Cl.
*B23K 7/00* (2006.01)
*B23K 37/02* (2006.01)

(52) U.S. Cl.
CPC .......... *B23K 7/003* (2013.01); *B23K 37/0235* (2013.01)

(58) Field of Classification Search
CPC .................................................... B23K 7/003
See application file for complete search history.

(56) References Cited

U.S. PATENT DOCUMENTS

| 4,194,727 A | 3/1980 | Layden et al. |
| 2009/0200714 A1 | 8/2009 | Moon |
| 2010/0327497 A1 | 12/2010 | Lotz |
| 2017/0056997 A1* | 3/2017 | Schutz .................. B23K 7/003 |

FOREIGN PATENT DOCUMENTS

| JP | 11314153 A | 11/1999 |
| JP | 2012139714 A | 7/2012 |

* cited by examiner

*Primary Examiner* — Scott R Kastler
(74) *Attorney, Agent, or Firm* — The Webb Law Firm

(57) ABSTRACT

A torch cutting machine comprising a longitudinal travel way, a main carriage that travels along the travel way, and a boom assembly extending from the main carriage perpendicular to the travel way, the boom assembly comprising at least one cutting torch extending from a main boom. The boom assembly is rotatable with respect to the main carriage. Also, a method of cutting metal material where a boom of a torch cutting machine having a cutting torch extending therefrom, is placed over metal material in a first cutting bed, which is cut by moving the cutting torch. The boom is rotated 180° and positioned over material in a second cutting bed, which is cut in the same manner. Cut material is removed from the first cutting bed and new material is placed in the first cutting bed while the cutting of the material in the second cutting bed is being performed.

17 Claims, 14 Drawing Sheets

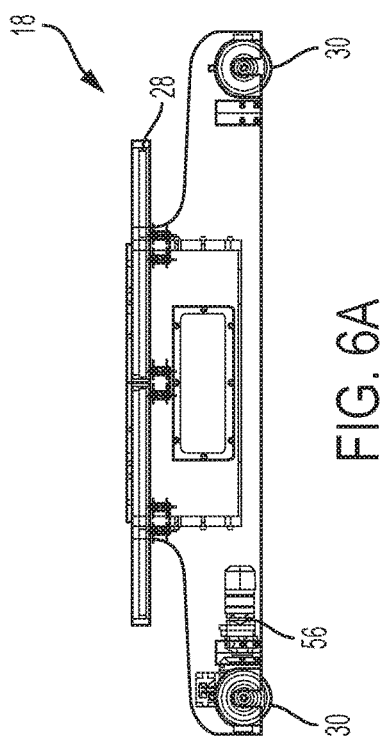
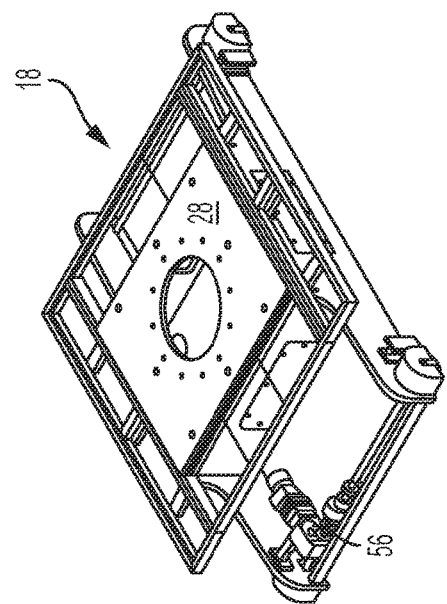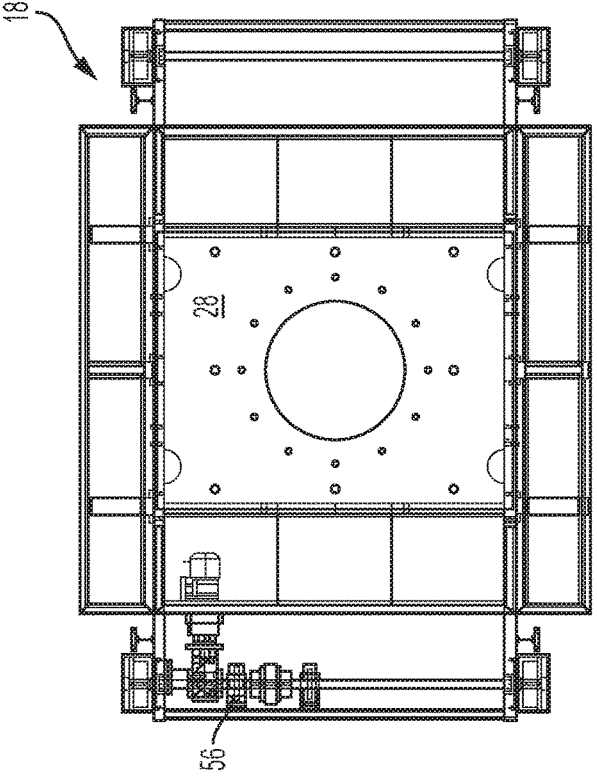

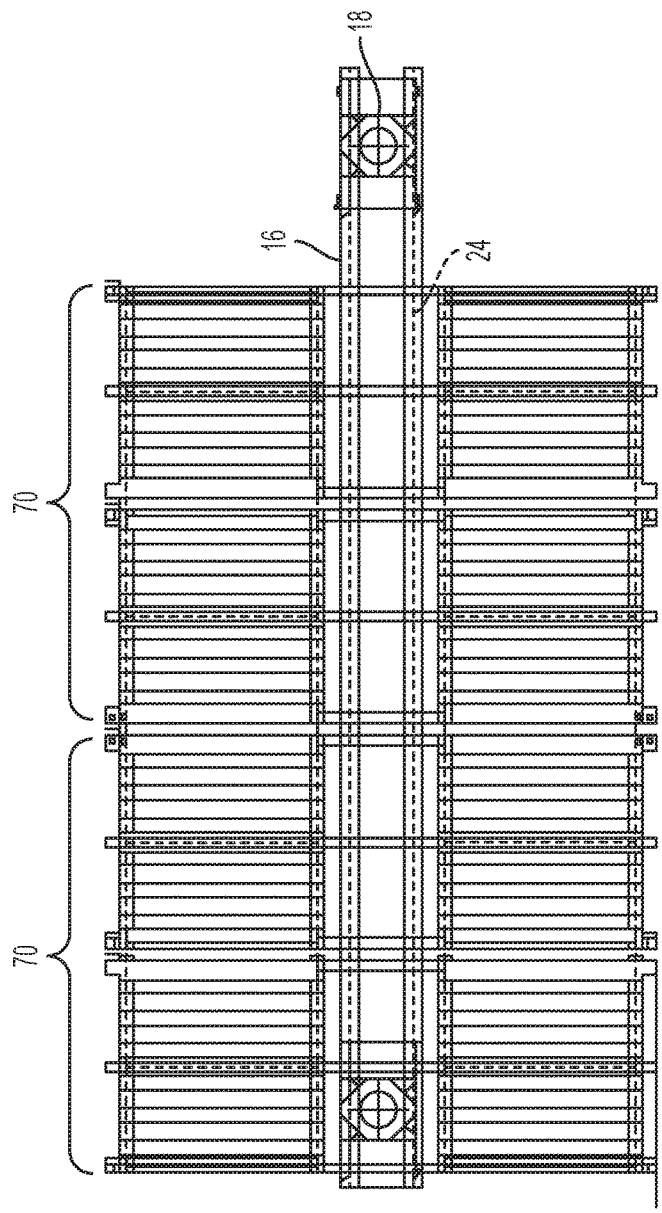
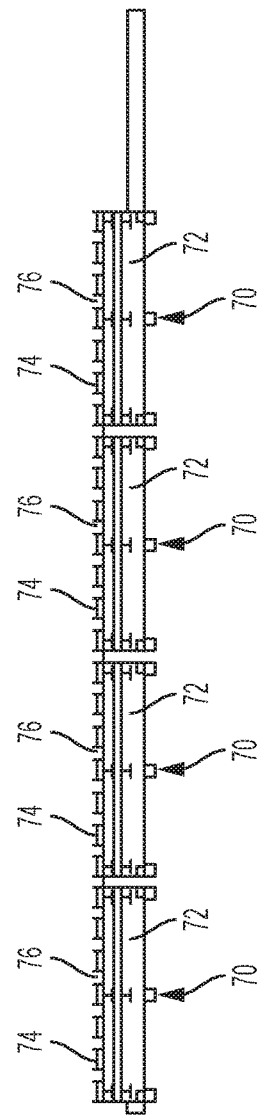
FIG. 14A
FIG. 14B

TORCH CUTTING MACHINE

CROSS-REFERENCE TO RELATED APPLICATION

This application claims priority to provisional U.S. application No. 62/209,475 filed Aug. 25, 2015, the disclosure of which is hereby incorporated by reference in its entirety.

BACKGROUND OF THE INVENTION

Field of the Invention

The present invention relates to a torch cutting machine for cutting large metal pieces and, more particularly, to a torch cutting machine that allows for continuous operation without down time to remove the cut pieces and replace them with new pieces to be cut.

Description of Related Art

During the processing of raw materials for metal melting operations, particularly steel making operations, it is often necessary to cut large pieces of scrap or other metal, such as steel slabs, plate, and tundish blocks, into smaller pieces that are more appropriate for the melting operation.

Often the metal pieces are manually cut by a human operator using a cutting torch that he or she must move from piece to piece. This exposes the operator to hazardous conditions and has very low efficiency.

Alternatively, a multi-torch cutting assembly having a central rail with a boom extending perpendicularly therefrom can be used. Cutting torches are mounted on the boom and may travel in a lateral direction along the length of the boom while the boom may travel in a longitudinal direction along the central rail. Slabs are placed in a cutting bed that extends the width of the boom and the length of the central rail. The cutting torches are moved along the boom or the boom is moved along the central rail to cut the metal pieces lying in the cutting bed in the lateral direction and the longitudinal direction respectively. The cutting torches may then be indexed along the boom or the boom indexed along the central rail to another position with respect to the metal pieces to make further cuts. When the cutting of the metal pieces has been completed, the operation is stopped while the cut metal pieces are removed from the cutting bed and new metal pieces are placed in the cutting bed.

Therefore, there exists a need for a torch cutting machine that can be continuously operated without stopping to remove the cut metal pieces from the cutting bed and replace them with new metal pieces.

SUMMARY OF THE INVENTION

The present invention is directed to a torch cutting machine comprising a longitudinal travel way, a main carriage adapted to travel along the travel way, and a boom assembly extending laterally from the main carriage in a direction perpendicular to the longitudinal travel way, the boom assembly comprising at least one cutting torch extending from a main boom, wherein the boom assembly is rotatable with respect to the main carriage. The boom assembly may rotate 180° with respect to the main carriage.

The main boom may be fixed with respect to the main carriage and the at least one cutting torch may be movable along the main boom or the at least one torch may be fixed with respect to the main boom and the main boom may be movable with respect to the main carriage.

The torch cutting machine may further comprise a vertical support extending from the main carriage and at least one of the boom assembly and the main boom may be movable along the vertical support and/or a torch boom extending perpendicular to the main boom, wherein a plurality of torches extend from the torch boom. At least one of the distance that the plurality of torches extend from the torch beam and placement of the plurality of torches along the torch beam may be adjustable.

The torch cutting machine may further comprise two cutting beds for holding material to be cut positioned on opposite sides of the travel way. A support system for supporting the material to be cut may be provided in the cutting beds. The support system may comprise modular platforms.

The present invention is also directed to a method of cutting metal material. A boom of a torch cutting machine, the boom having at least one cutting torch extending therefrom, is placed over metal material in a first cutting bed. The at least one torch is lit and then moved with respect to the metal material in the first cutting bed to cut the metal material. The boom of the torch cutting machine is rotated 180° to place the boom over metal material in a second cutting bed. The at least one torch is lit and then moved with respect to the metal material in the second cutting bed to cut the metal material. While the metal material in the second cutting bed is being cut, cut metal material is removed from the first cutting bed and new metal material to be cut is placed in the first cutting bed.

The at least one torch may be moved with respect to the metal material by moving the at least one torch along the boom or by moving the boom with respect to the metal material. The height of the boom above the metal material may be adjustable.

The torch cutting machine may further comprise a torch boom extending perpendicular to the boom and a plurality of torches extending from the torch boom.

A support system for supporting the material to be cut may be provided in the cutting beds. The support system may comprise modular platforms.

The present invention is also directed to an apparatus for cutting metal material comprising a torch cutting machine as described above and two cutting beds for holding metal material to be cut positioned on opposite sides of the travel way.

Clause 1: A torch cutting machine comprising: a longitudinal travel way; a main carriage adapted to travel along the travel way; and a boom assembly extending laterally from the main carriage in a direction perpendicular to the longitudinal travel way, the boom assembly comprising at least one cutting torch extending from a main boom, wherein the boom assembly is rotatable with respect to the main carriage.

Clause 2: The torch cutting machine of clause 1, wherein the main boom is fixed with respect to the main carriage and the at least one cutting torch is movable along the main boom.

Clause 3: The torch cutting machine of clause 1, wherein the at least one torch is fixed with respect to the main boom, and the main boom is movable with respect to the main carriage.

Clause 4: The torch cutting machine of clauses 1-3, wherein the torch cutting machine further comprises a vertical support extending from the main carriage and at least one of the boom assembly and the main boom is movable along the vertical support.

Clause 5: The torch cutting machine of clauses 1-4, further comprising a torch boom extending perpendicular to the main boom, wherein a plurality of torches extend from the torch boom.

Clause 6: The torch cutting machine of clause 5, wherein at least one of the distance that the plurality of torches extend from the torch beam and placement of the plurality of torches along the torch beam is adjustable.

Clause 7: The torch cutting machine of clauses 1-6, wherein the boom assembly rotates 180° with respect to the main carriage.

Clause 8: The torch cutting machine of clauses 1-7, further comprising two cutting beds for holding material to be cut positioned on opposite sides of the travel way.

Clause 9: The torch cutting machine of clauses 1-8, wherein a support system for supporting material to be cut is provided in the cutting beds.

Clause 10: The torch cutting machine of clauses 1-9, wherein the support system comprises modular platforms.

Clause 11: A method of cutting metal material comprising: placing a boom of a torch cutting machine, the boom having at least one cutting torch extending therefrom, over metal material in a first cutting bed; lighting the at least one torch and moving the at least one torch with respect to the metal material in the first cutting bed to cut the metal material; rotating the boom of the torch cutting machine 180° to place the boom over metal material in a second cutting bed; and lighting the at least one torch and moving the at least one torch with respect to the metal material in the second cutting bed to cut the metal material, wherein while the metal material in the second cutting bed is being cut, cut metal material is removed from the first cutting bed and new metal material to be cut is placed in the first cutting bed.

Clause 12: The method of cutting metal material of clause 11, wherein the at least one torch is moved with respect to the metal material by moving the at least one torch along the boom.

Clause 13: The method of cutting metal material of clauses 11 or 12, wherein the at least one torch is moved with respect to the metal material by moving the boom with respect to the metal material.

Clause 14: The method of cutting metal material of clauses 11-13, wherein a height of the boom above the metal material is adjustable.

Clause 15: The method of cutting metal material of clauses 11-14, wherein the torch cutting machine further comprises a torch boom extending perpendicular to the boom, and a plurality of torches extend from the torch boom.

Clause 16: The method of cutting metal material of clauses 11-15, wherein a support system for supporting material to be cut is provided in the cutting beds.

Clause 17: The method of cutting metal material of clause 16, wherein the support system comprises modular platforms.

Clause 18: An apparatus for cutting metal material comprising: a torch cutting machine comprising a longitudinal travel way; a main carriage adapted to travel along the travel way; and a boom assembly extending laterally from the main carriage in a direction perpendicular to the longitudinal travel way and comprising at least one cutting torch extending from a main boom, wherein the boom assembly is rotatable with respect to the main carriage; and two cutting beds for holding metal material to be cut positioned on opposite sides of the travel way.

Clause 19: The apparatus of clause 18, wherein the boom assembly rotates 180° with respect to the main carriage.

BRIEF DESCRIPTION OF THE DRAWINGS

FIG. 6A is a side view of a machine carriage for a torch cutting machine according to the present invention;

FIG. 6B is a top view of a machine carriage for a torch cutting machine according to the present invention;

FIG. 6C is a perspective view of a machine carriage for a torch cutting machine according to the present invention;

FIG. 14A is a top view of support beds for a torch cutting machine according to the present invention; and FIG. 14B is a side view of support beds for a torch cutting machine according to the present invention.

DESCRIPTION OF THE INVENTION

Figure 1:
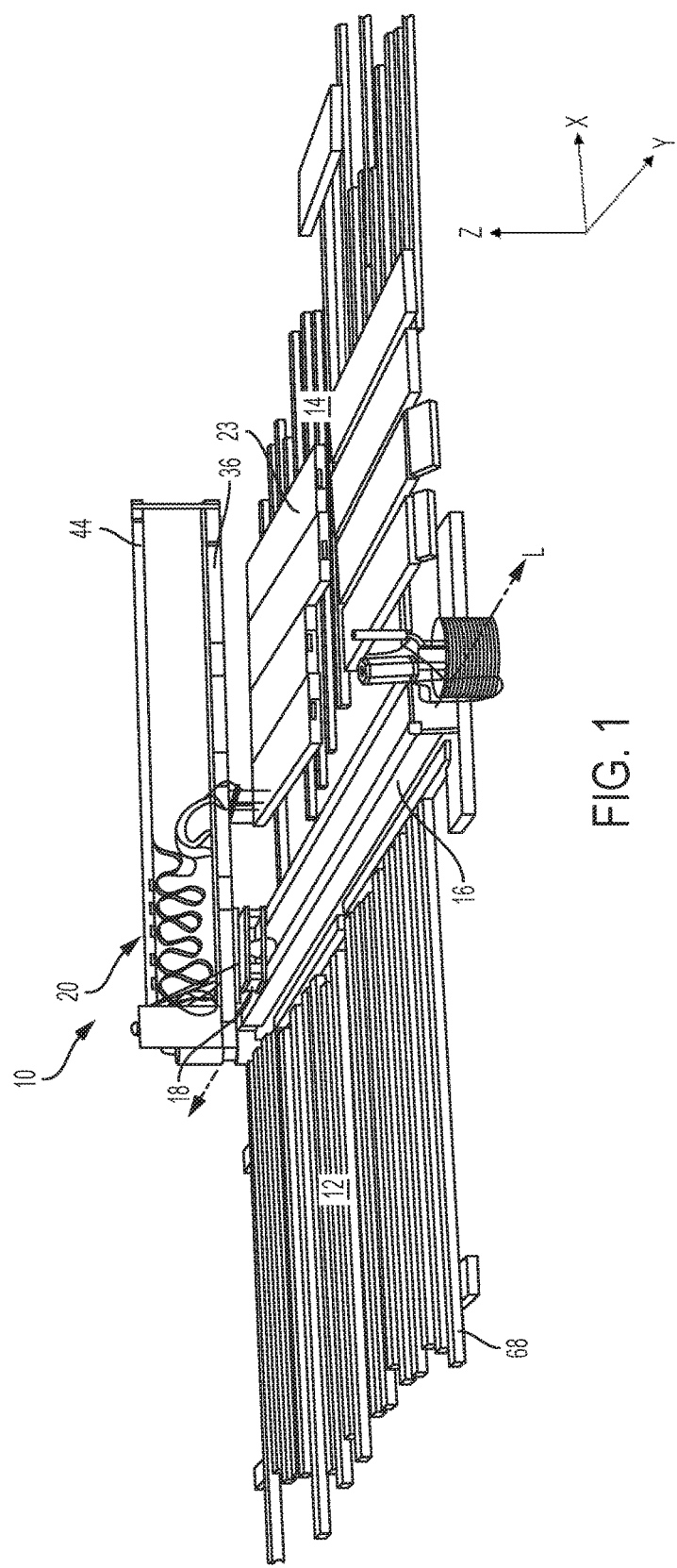
FIG. 1 is a perspective view of a torch cutting machine according to a first embodiment of the present invention, along with a cutting bed on each side of the torch cutting machine.

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention.

Hence, specific dimensions and other physical characteristics related to the embodiments disclosed herein are not to be considered as limiting.

The present invention is directed to a torch cutting machine 10, 110 with a pivoting boom adapted for continuous use for cutting metal pieces, such as steel slabs, plate, and tundish blocks. The cutting machine 10, 110 is designed so that material can be unloaded and loaded on one cutting bed 12 while cutting continues on a second cutting bed 14 without interruption of the cutting operation.

The cutting machine 10 comprises: an elevated travel way 16, a main carriage 18 that travels along the elevated travel way 16, and a main boom assembly 20 extending from the main carriage 18 and including at least one cutting torch 22. The cutting machine 10 is adapted to allow the cutting torches 22 to traverse in both the longitudinal and the transverse directions of the cutting beds 12, 14 containing material 23 to be cut, i.e., parallel to the longitudinal axis L of the travel way 16 and perpendicular to the longitudinal axis L of the travel way 16.

The main carriage 18 is mounted on the travel way 16 and movable with respect to the travel way 16 such that it can be moved from one end of the travel way 16 to the other in a longitudinal direction.

The travel way 16 may have two parallel tracks 24 spaced apart from one another. The tracks 24 may be installed with or without permanent foundations in a direction parallel to the longitudinal side of the cutting beds 12, 14. The tracks may have any length from 40 feet to hundreds of feet depending on how far the cutting beds 12, 14 extend in the longitudinal direction.

As best seen in FIGS. 5 and 6A-6C, the main carriage 18 comprises a support platform 28 having wheels 30 attached to the lower side, similar to a train car. The wheels 30 are spaced apart the same distance as the two tracks 24 of the travel way 16 and are adapted to run along the tracks 24.

A large thrust bearing 32 is attached to the top of the main carriage 18 and the main boom assembly 20 is secured to the thrust bearing 32 via an attachment plate 35.

Figure 2:
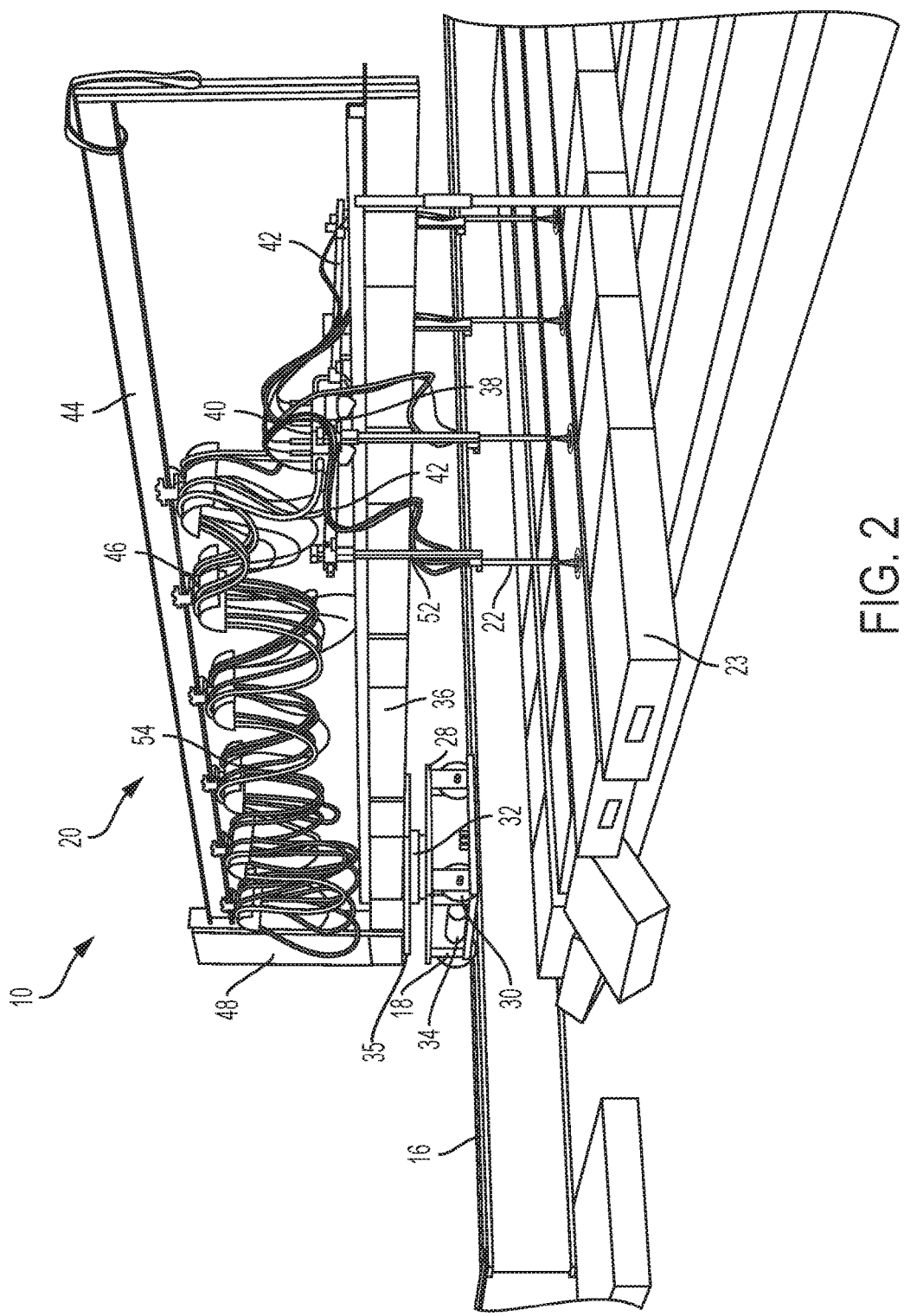
FIG. 2 is a perspective view of a torch cutting machine according to a first embodiment of the present invention.
Figure 3:
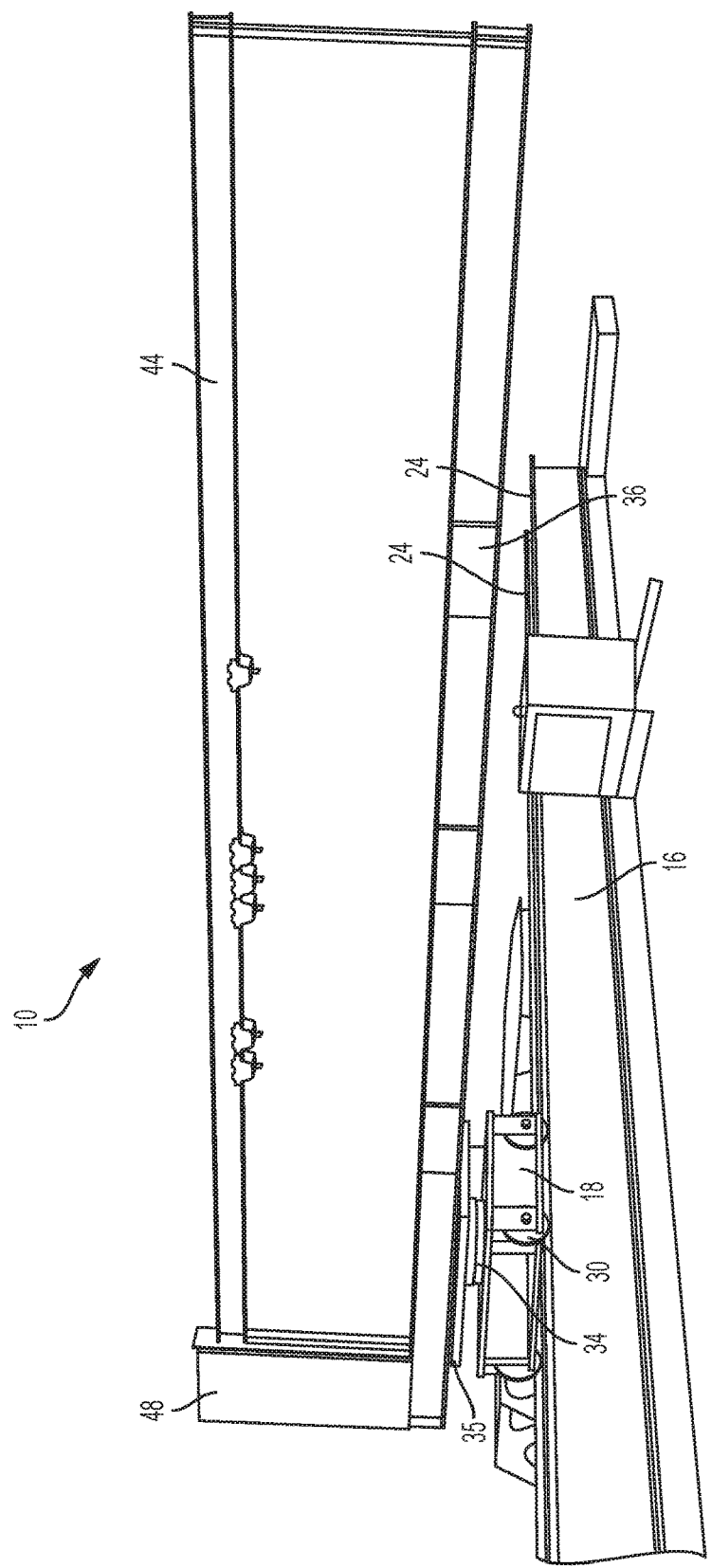
FIG. 3 is a perspective view of a partially assembled torch cutting machine according to a first embodiment of the present invention.
Figure 4:
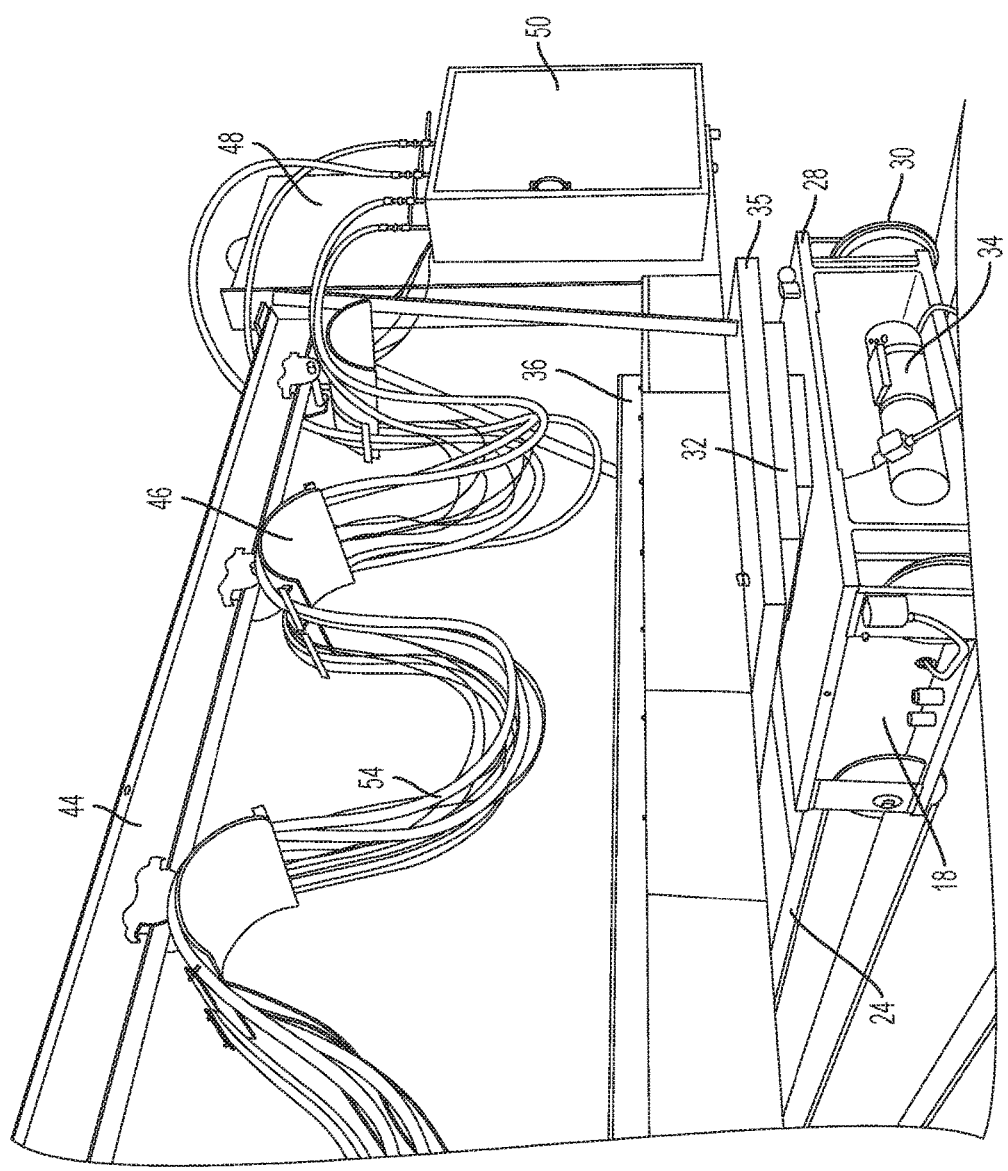
FIG. 4 is a perspective view showing one end of a torch cutting machine according to a first embodiment of the present invention.
Figure 5:
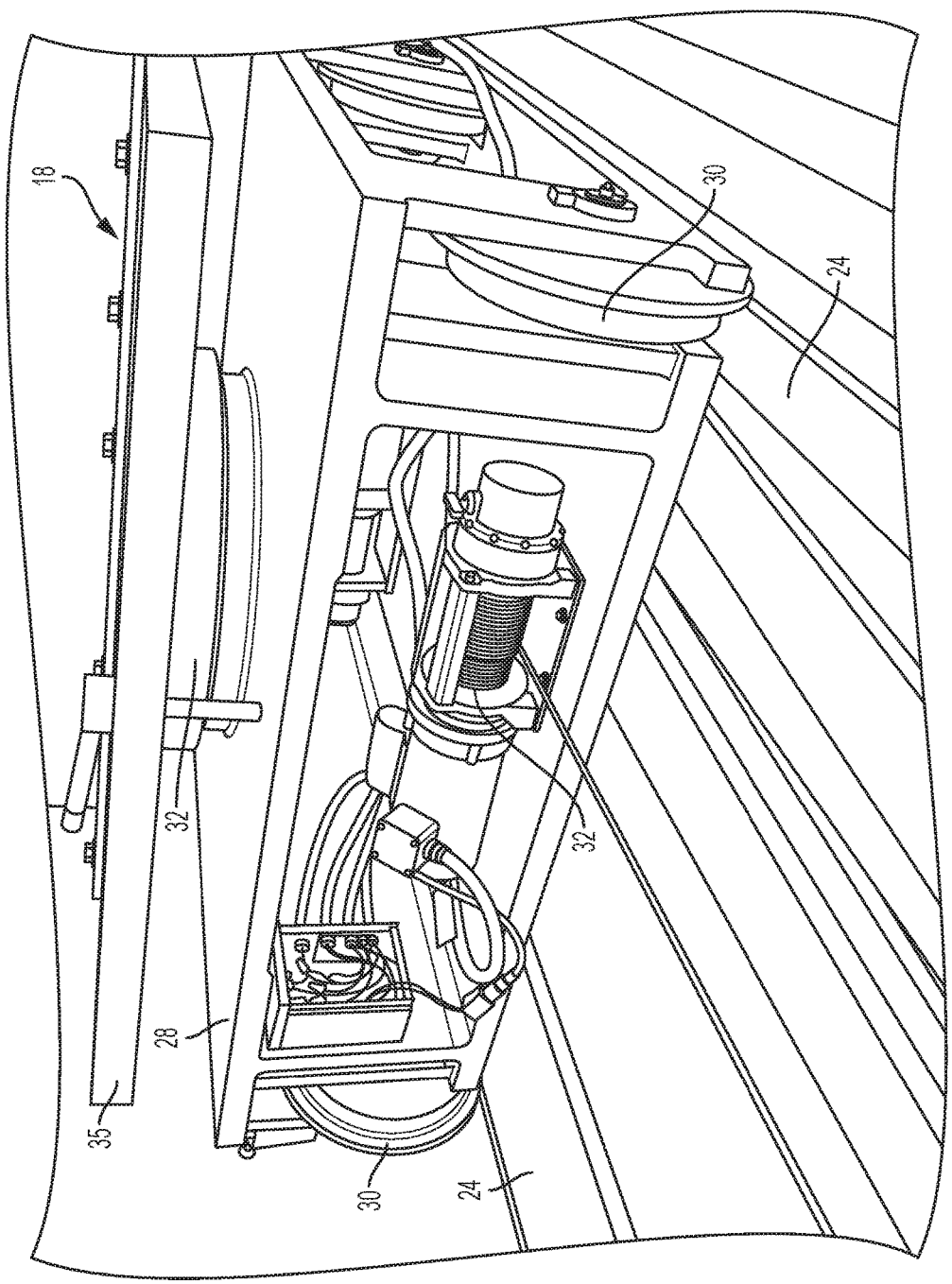
FIG. 5 is a perspective view of a main carriage of a torch cutting machine according to the present invention.
Figure 7:
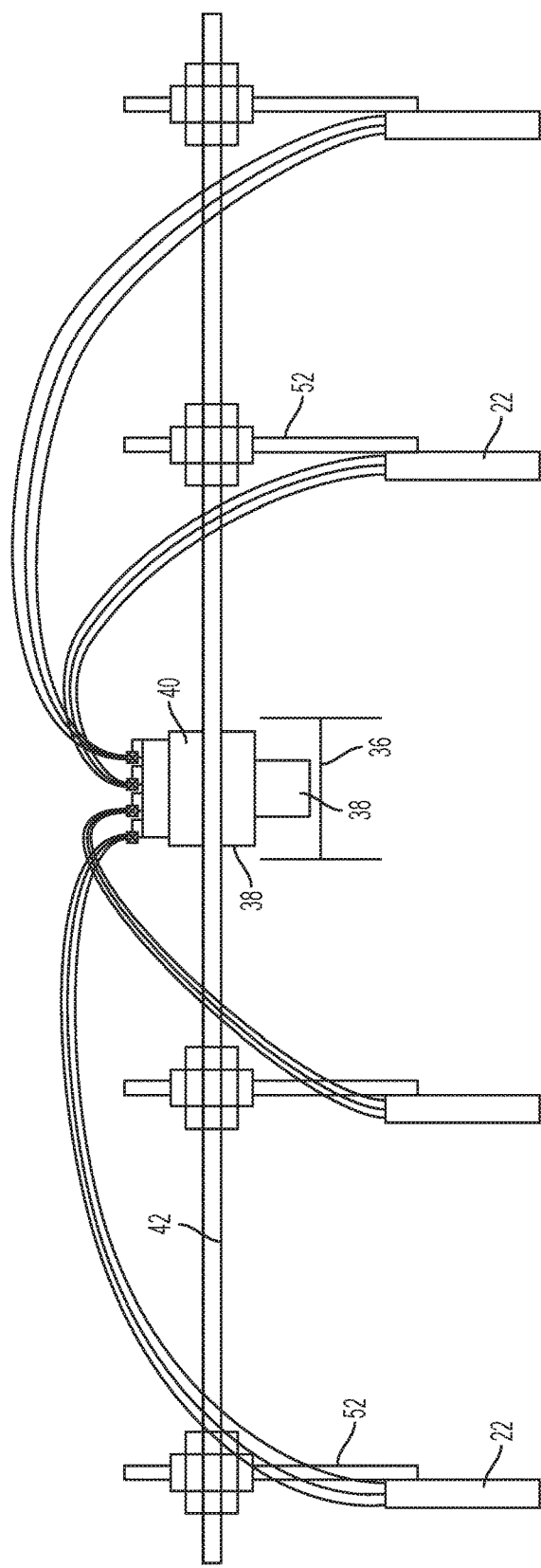
FIG. 7 is a side view of the torch beam of a torch cutting machine according to a first embodiment of the present invention.
Figure 8:
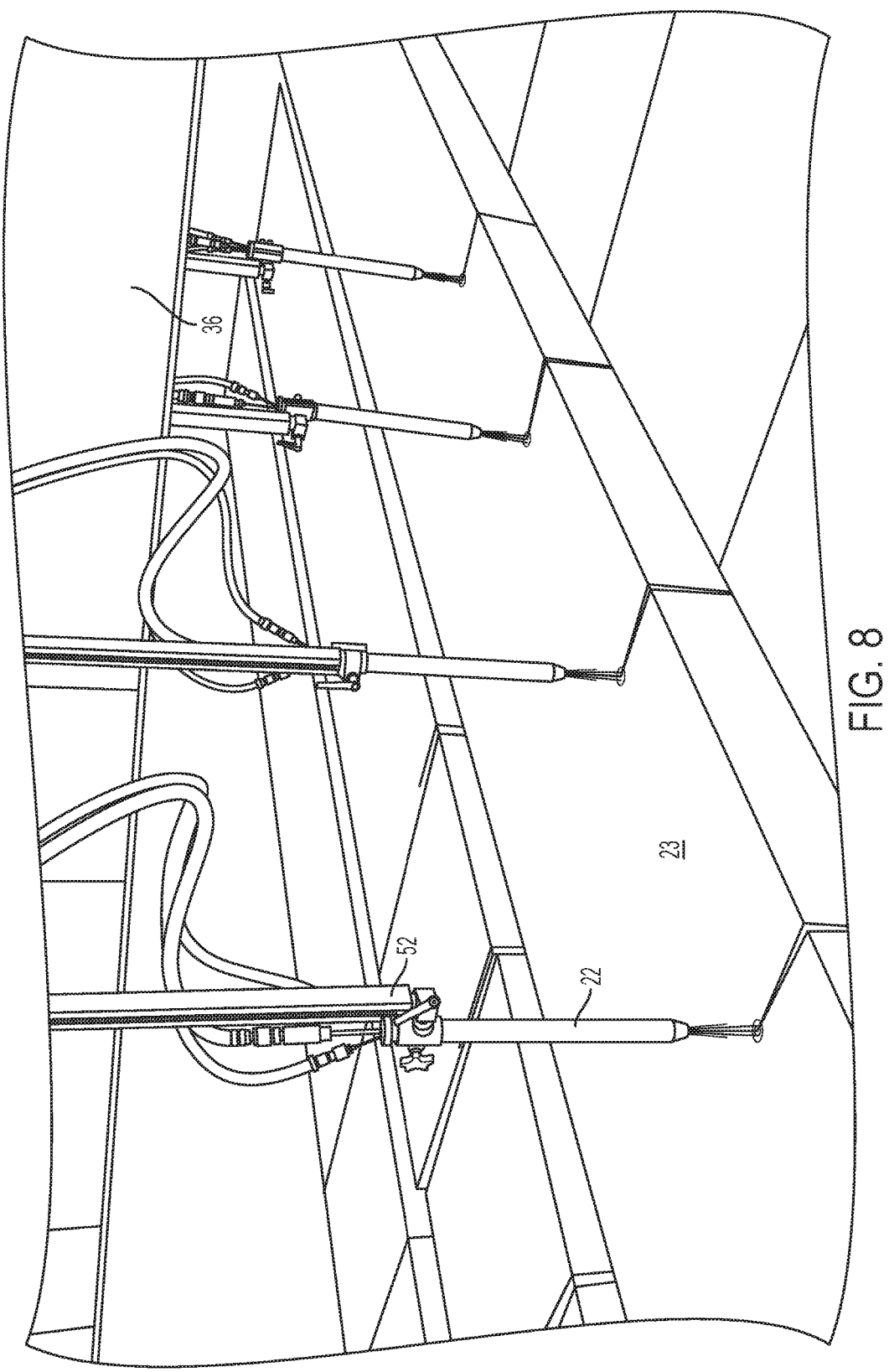
FIG. 8 is a perspective view showing the torches of a torch cutting machine according to the present invention.

Any suitable method may be used to provide for movement of the main carriage 18 along the travel way 16. In the embodiment shown in FIGS. 2, 4, and 6, a motorized cable winch system having two winches 34 pulls the main carriage 18. The motorized winch system may have a single variable speed drive motor/gear reducer to move the main carriage 18 along the travel way 16 at controlled and variable speeds for longitudinal cuts if necessary. The winches 34 may be mounted at one end of the travel way 16 or may be mounted on the support platform 28 of the main carriage 18.

In the embodiment shown in FIGS. 6A-6C and 10, the main carriage 18 is equipped with a gear motor 56. The gear motor 56 may be controlled by an operator to move the main carriage 18 along the travel way 16 at controlled and variable speeds.

Alternatively, the main carriage 18 may be equipped with an axle drive system to move it along the travel way 16 via a variable speed gear motor or a rack and pinion gear motor system where the linear gear rack is attached to the elevated travel way 16 and the gear motor with a pinion gear sprocket is mounted to the main carriage 18.

The main boom assembly 20 includes a main boom 36, a torch buggy 38 including a trailer 40, a torch boom 42, a festoon beam 44 with trolley cars 46, at least one cutting torch 22, and support equipment.

The main boom assembly 20 extends laterally from the main carriage 18, i.e., perpendicular to the longitudinal axis L of the travel way 16. The portion of the main boom assembly 20 on which the torch buggy 38, trailer 40, torch boom 42, festoon beam 44, trolley cars 46, cutting torches 22, and support equipment are mounted is cantilevered from the centerline of the main carriage 18, and the remaining, shorter portion of the main boom assembly 20 that is cantilevered on the opposite side of the main carriage 18, is balanced with an equally heavy counterweight 48. Thus, the main boom assembly 20 is balanced over the bearing 32 which allows the main boom assembly 20 to pivot from one side of the travel way 16 to the other, i.e., over an angle of 180°. Therefore, the cutting torch 22 can be used to cut material on either side of the travel way 16.

The main boom assembly 20 includes a main boom 36 that acts as a track on which the torch buggy 38 rides. The main boom 36 may be an I-beam, and may have a width of 12-16 inches.

The torch buggy 38 includes a trailer portion 40 that supports ancillary cutting torch support equipment including gas and oxygen manifolds, a control panel, and/or a remote control for the torch buggy 38.

A torch boom 42 extends from the torch buggy 38 in a longitudinal direction parallel to the longitudinal axis L of the travel way 16 and perpendicular to the main boom 36. The torch boom 42 may extend a distance of 10-18 feet. At least one rack arm and rack box 52 extend in a downward direction from the torch boom 36 and at least one cutting torch 22 is held within the rack arm 52. The rack arms and rack boxes 52 allow adjustment of the position of the cutting torches 22 with respect to the main boom 26. The cutting torches 22 may be raised or lowered in relation to the main boom 36 and the material to be cut and/or the separation distance between the cutting torches 22 may be adjusted to place the cutting torches 22 closer to or farther apart from one another.

A festoon beam 44 extends parallel to and above the main boom 36. The festoon beam 44 may be 4 feet or more above the main beam 36. The festoon beam 44 may be an I-beam and may be 8 inches in width. Trolley cars 46 hang down from and ride along the festoon beam 44. The trolley cars 46 carry the oxygen and fuel gas hoses 54 and electrical wiring from the gas regulating station 50 to the gas and oxygen manifolds and control panels on the torch buggy trailer 40.

The gas regulating station 50 may be affixed to the counterweight 48 or a portion of the main carriage 18. The gas regulating station 50 may be controlled by a programmable logic controller (PLC) located in a cabinet near the gas regulation station 50, and may be equipped to control the cutting torch 22 on, off, preheat, and cut functions electrically from a remote control.

The main oxygen and fuel hoses 26 for the cutting torches 22, which are connected to the main carriage 18, are contained in the area between the two tracks 24 to protect them from sparks, abrasion, and debris. Because the tracks 24 are elevated, for example, a minimum of 2 feet, above the cutting bed 12, 14, the sparks and slag from the cutting process are less likely to reach the main oxygen and fuel hoses 54. The elevated travel way 16 is also adapted to reduce the need for cleaning, not only slag and debris, but also snow and ice.

While the cutting torches 22 have herein been described as oxygen/fuel torches, any suitable cutting torch for cutting the material may be used. In one aspect, a torch having a post-mix tip may be used. With a post-mix tip, the oxygen and fuel mix outside of the torch before combusting as opposed to a pre-mix tip where the gasses mix inside of the tip and combustion is outside of the tip. Use of a post-mix tip heats the entire depth of the cut for more complete burning of the fuel gasses. Preferably, 2 to 10 cutting torches 22 are located on the torch boom 42 and are operated by a single operator via a remote control, a fixed control panel, or a combination of both. Using the remote control and/or control panel, the operator of the cutting machine can adjust cutting torch height, cutting torch separation, and the number of cutting torches cutting at any given time based on material to be cut.

In another embodiment, the torch cutting machine 110 may have a retractable main boom 136 instead of a fixed main boom 36. A vertical support 58 is attached to the thrust bearing 32 on the main carriage 18. The retractable main boom 136 extends laterally from the vertical support 58 in a direction that is perpendicular to the longitudinal axis L of the travel way 16. The retractable main boom 136 may be moved with respect to the vertical support 58, i.e., in a direction perpendicular to the longitudinal axis of the travel way 16. The torch boom 42 is fixed at one end of the retractable main boom 136. The festoon beam 44 is fixed to and extends laterally from the vertical support 58.

Figure 9:
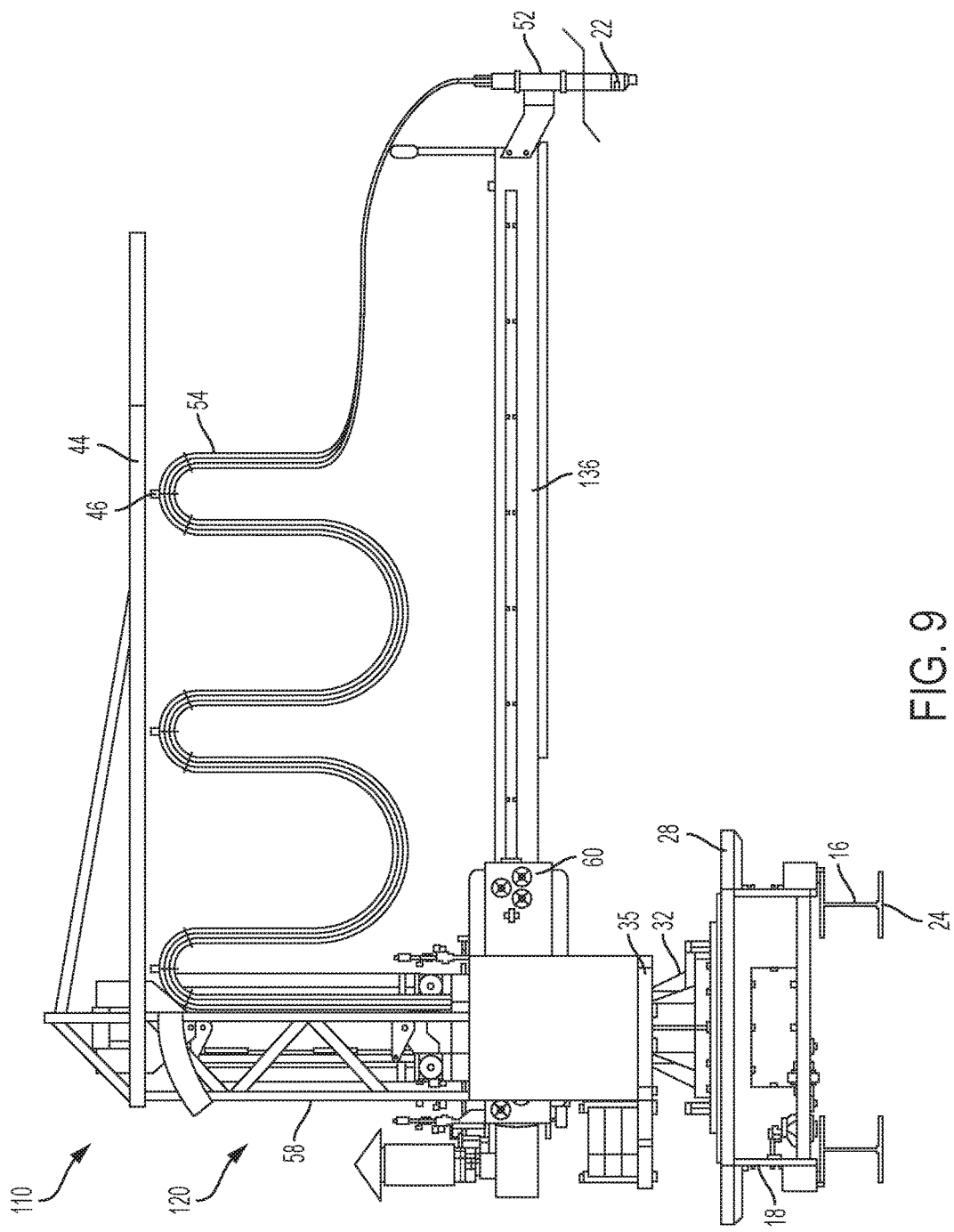
FIG. 9 is a side view of a torch cutting machine according to a second embodiment of the present invention.
Figure 10:
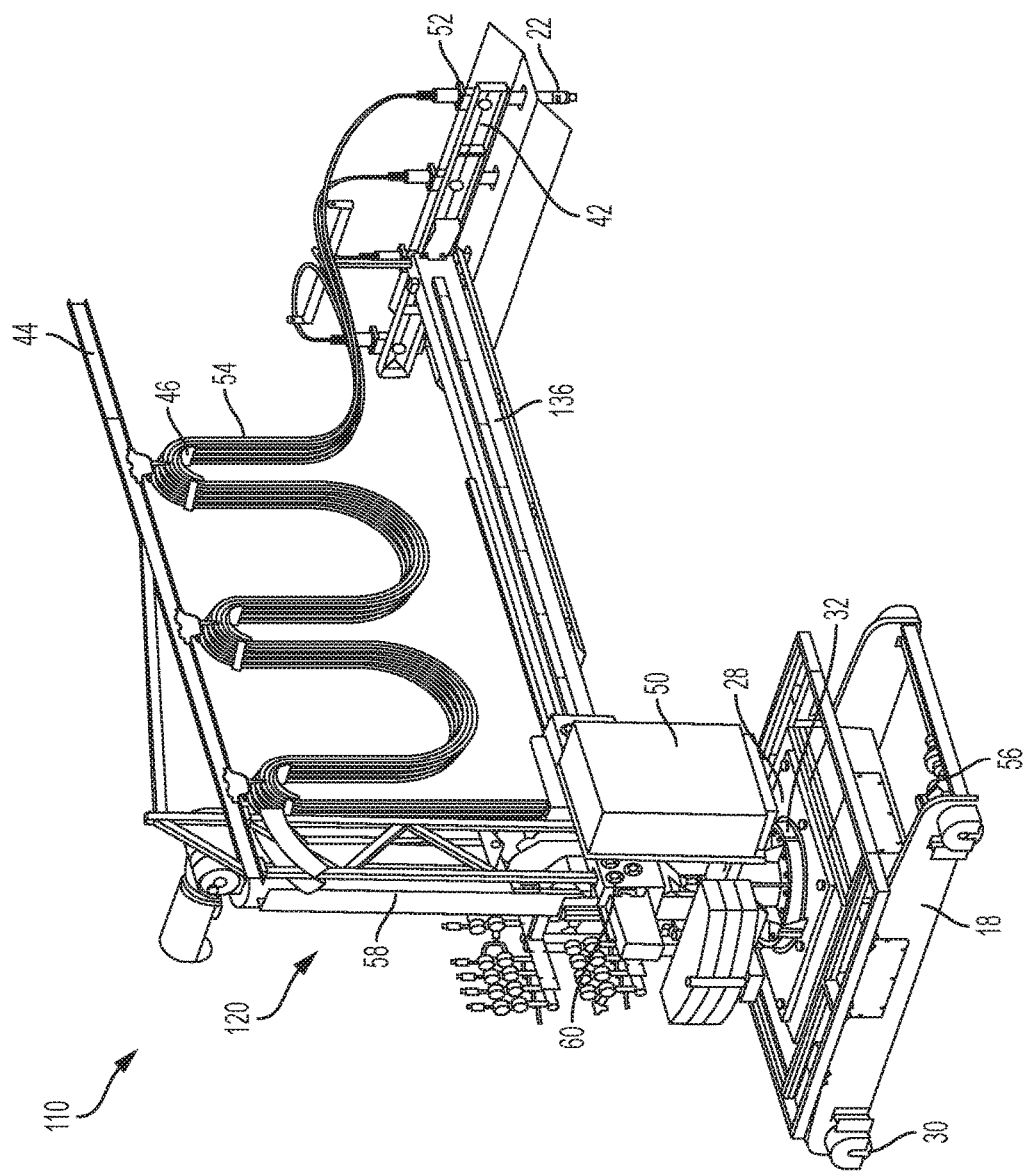
FIG. 10 is a perspective view of a torch cutting machine according to a second embodiment of the present invention.
Figure 11:
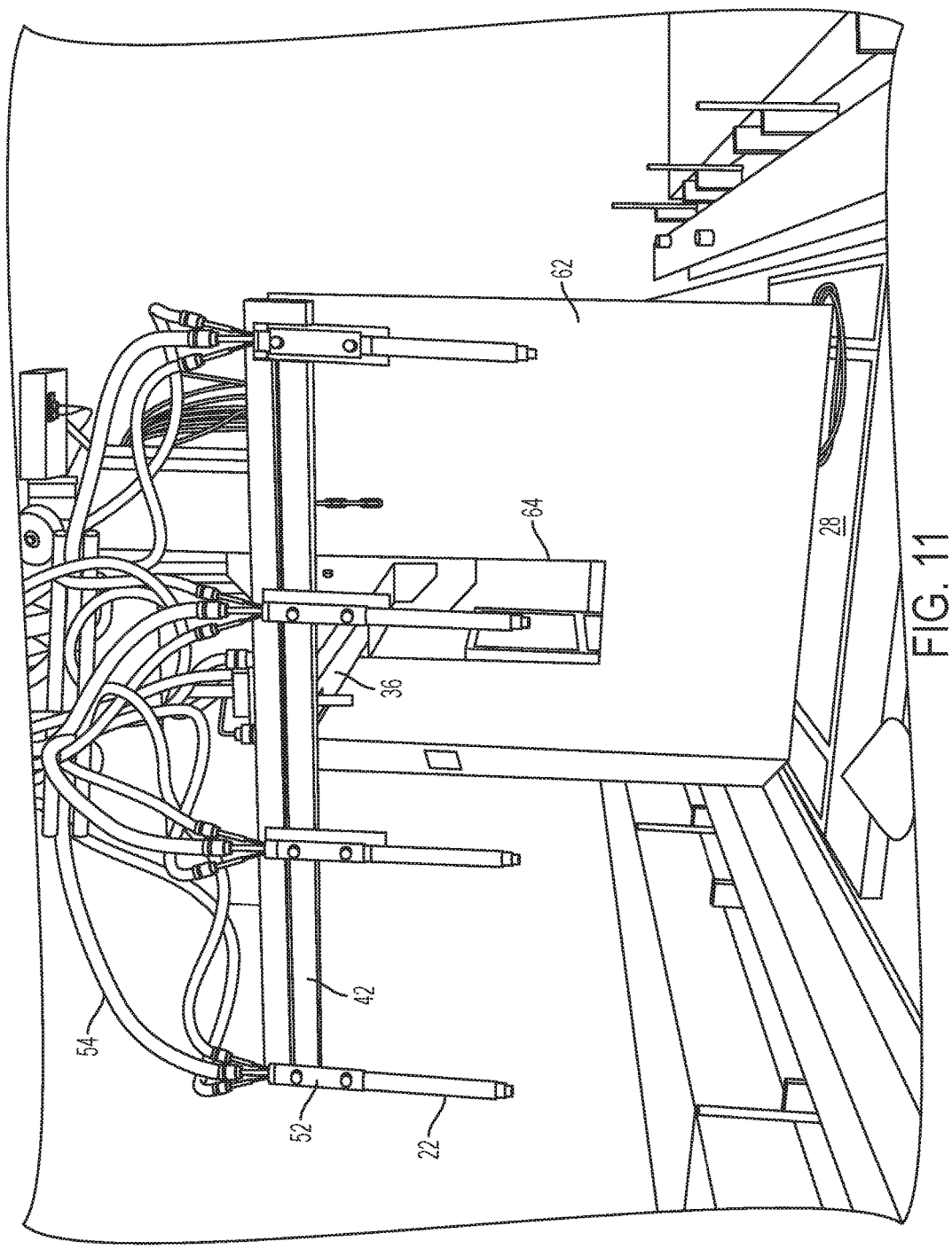
FIG. 11 is a perspective view of a heat shield mounted on a torch cutting machine according to the present invention.
Figure 12:
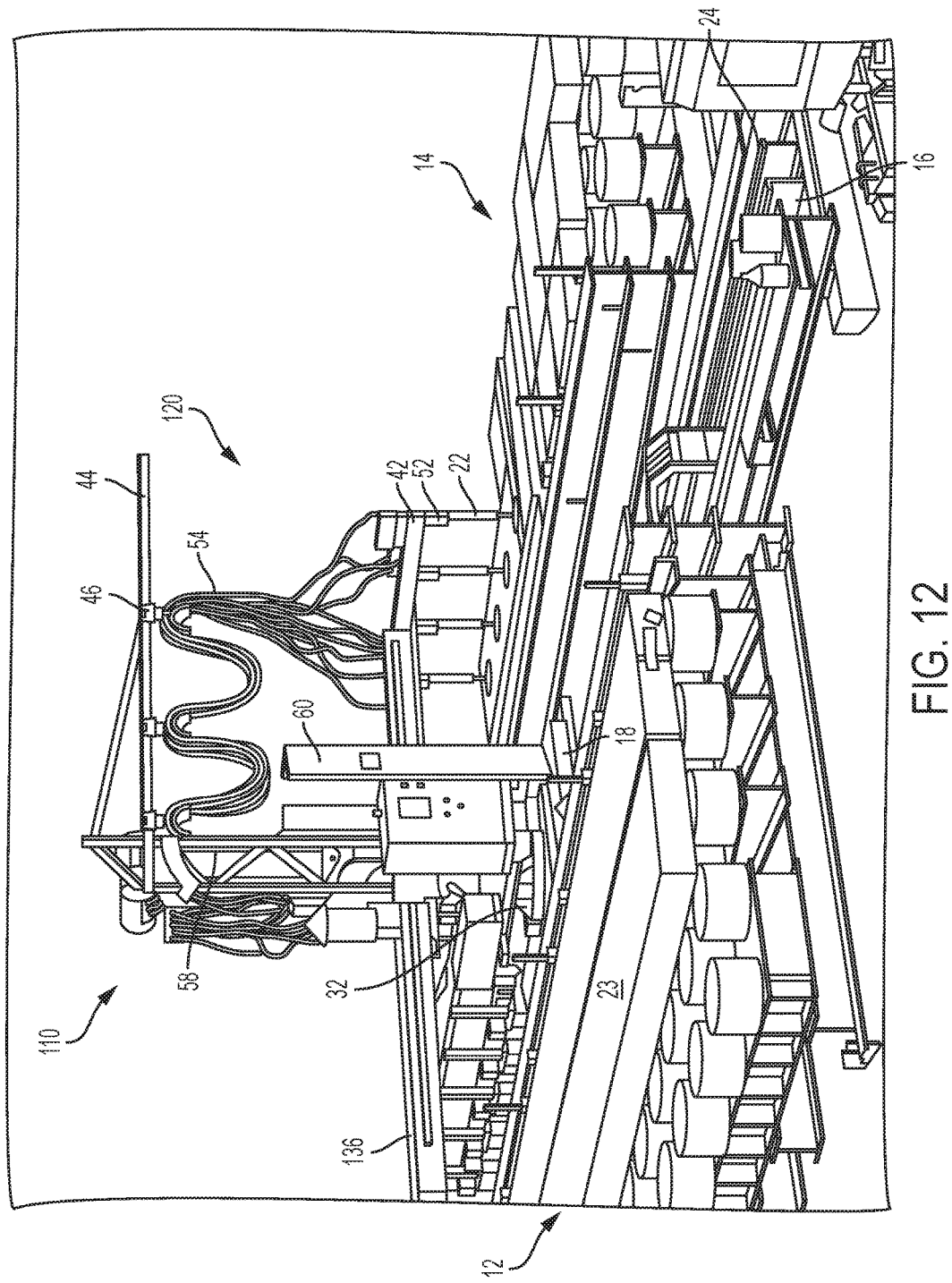
FIG. 12 is a perspective view of a torch cutting machine according to a second embodiment of the present invention.

FIG. 9 shows the retractable main boom 136 fully extended, and FIG. 12 shows the retractable main boom 136 partially retracted.

The retractable main boom 136 may be fixedly attached to the vertical support 58 or may be attached via a carrier 60 that is movable in a vertical direction along the vertical support 58. As the carrier 60 is moved along the vertical support 58, the height of the retractable main boom 136, the torch boom 42, and the torches 22 above the material 23 placed in the cutting beds, 12, 14 is changed allowing materials of different thicknesses to be cut.

Similarly, the previously described cutting machine 10 can be equipped with a vertical support and a carrier so that the height of the fixed main boom 36 can be adjusted.

The torch cutting machine 10, 110 may be controlled by a wireless remote control system that allows the operator to control the direction, speed, and height of the torches 22 and also gives the operator the ability to turn the torches on and off from a remote and safe location.

Along with the remote control system, another safety measure that can be provided on the torch cutting machine 10, 110 are heat shields 62. Heat shields 62 can be mounted onto the main carriage 18 of the torch cutting machine 10, 110. When the operator is riding on the main carriage 18 during operation, the heat shields 62 protect the operator from the heat and sparks created during the cutting operation. These heat shields 62 are placed between the main carriage 18 and the torches 22. If the torch cutting machine 110 has a retractable main boom 136, the heat shield 62 may be located adjacent the edge of the main carriage 18 so that the retractable main boom 136 can retract as necessary without interference from the heat shield 62. This heat shield 62 may be constructed with a slot 64 in its frame to allow vertical movement of the main boom 36, 136.

The main boom 36 in combination with the torch buggy 38 and trailer 40 in one embodiment and the retractable main boom 136 in another embodiment allow the torches 22 to be moved in a transverse, X, direction with respect to the material 23 being cut. The travel way 16 and the main carriage 18 allow the torches 22 to be moved in a longitudinal, Y, direction with respect to the material 23 being cut. And, the vertical support 58 and carrier 60 allow the torches 22 to be moved in a vertical, Z, direction with respect to the material 23 being cut. All of these movements may occur individually or simultaneously during, before, or after cutting.

Various systems for supporting the material 23 to be cut may be provided in the cutting beds 12, 14. In one non-limiting example, hollow cylinders 66 organized in a grid pattern having rows and columns may be placed in the cutting bed 12, 14 (FIG. 12). The placement of the hollow cylinders 66 allows the material 23 to be cut to be supported while leaving space between the cylinders 66 for the flames of the torches 22 the cutting debris to pass. The hollow cylinders 66 may be placed directly on the ground of the cutting bed or on another support system.

In another non-limiting example, a series of beams 68 may be placed in the cutting beds 12, 14 for supporting the material 23 to be cut (FIG. 1).

Figure 13:
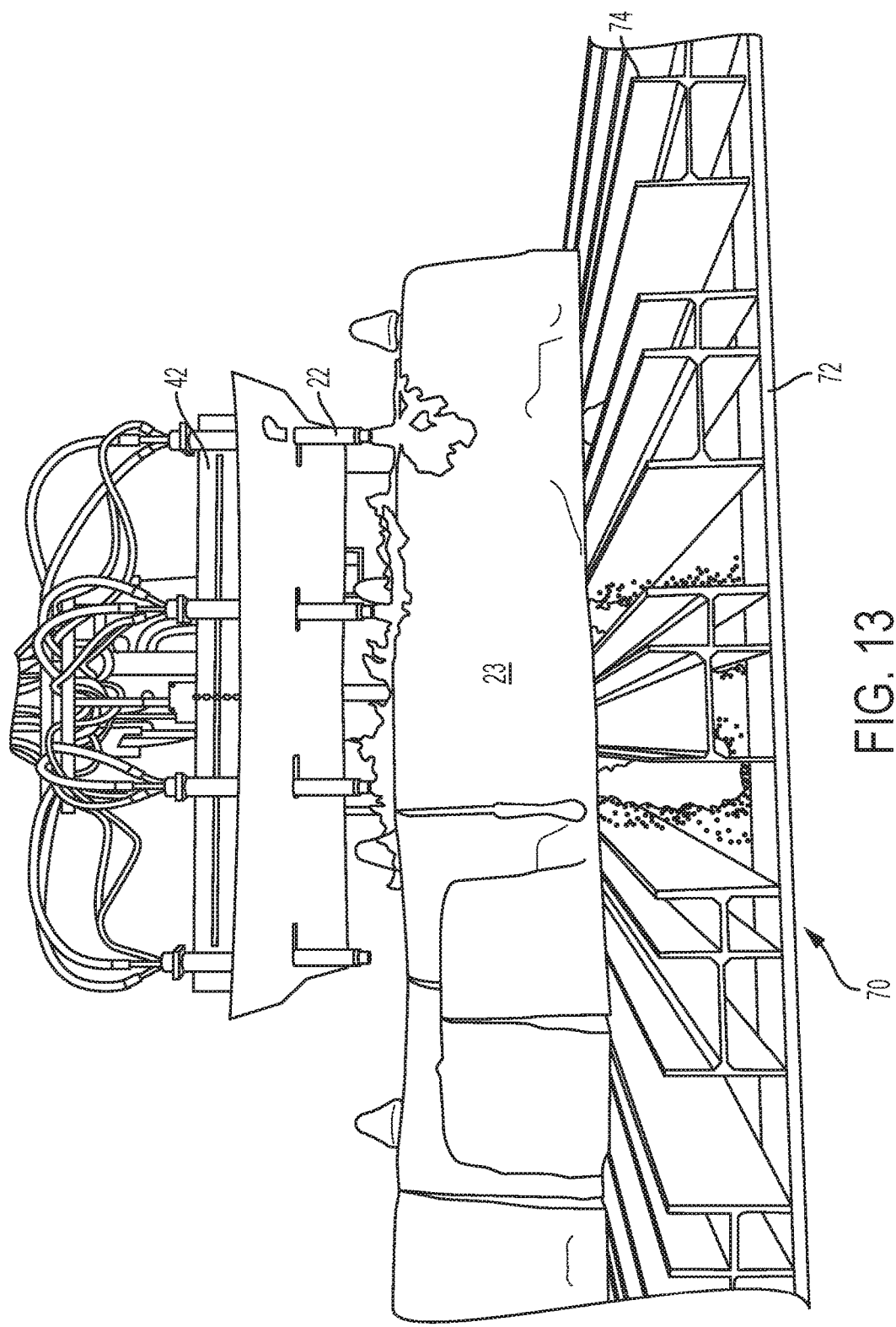
FIG. 13 is a perspective view of a torch cutting machine according to the present invention in operation.

In yet another non-limiting example shown in FIGS. 13, 14A, and 14B, a modular support system may be provided. Individual support platforms 70 are provided. Each support platform 70 has a substantially rectangular base structure 72. Beams 74 are placed on the upper surface of the base structure 72 in a parallel manner such that an open space 76 is provided between each pair of beams 74 to allow passage of the torch 22 flames and cutting debris during operation. These support platforms 70 provide a stable foundation for the material 23 to be cut and the plurality of open spaces 76 between the beams 74 allows the distance between cuts to be variable and adjustable. This modular support platform 70 system allows the size and shape of the support system to be varied to allow different sizes and shapes of material to be cut.

In use, the material 23 to be cut is located in the first cutting bed 12 which extends along one side of the travel way 16 for a longitudinal distance approximately equal to the length of the travel way 16 and outward from the travel way 16 for a transverse distance approximately equal to the length of the main boom 36 or the retractable boom 136 when fully extended. The main boom assembly 120 is positioned over the first area of the pieces of material 23 to be cut. The cutting torches 22 are lit and either the torch buggy 38 slowly travels along the main boom 36 or the retractable main boom 136 is moved with respect to the vertical support 58 to make lateral cuts in the material 23. Once the first pieces of the material 23 have been cut, the main carriage 18 travels along the travel way 16 to position the main boom assembly 20, 120 over a second area of the pieces of material 23 to be cut. The cutting torches 22 are lit and the torch buggy 38 slowly travels along the main boom 36 or the retractable main boom 136 is moved with respect to the vertical support 58 to make lateral cuts in the material 23. These steps are repeated until all of the material 23 in the first cutting bed 12 has been cut.

As the cutting of the material 23 in the first cutting bed 12 proceeds, more material 23 to be cut is located in the second cutting bed 14 which extends in along the other side of the travel way 16 for a longitudinal distance approximately equal to the length of the travel way 16 and outward from the travel way 16 for a transverse distance approximately equal to the length of the main boom 36 or the retractable boom 136 when fully extended.

When cutting in the first cutting bed 12 is completed, the main boom assembly 20, 120 is rotated 180° and positioned over the first area of the pieces of material 23 to be cut in the second cutting bed 14. The cutting torches 22 are lit and either the torch buggy 38 slowly travels along the main boom 36 or the retractable main boom 136 is moved with respect to the vertical support 58 to make lateral cuts in the material 23. Once the first pieces of the material 23 have been cut, the main carriage 18 travels along the travel way 16 to position the main boom assembly 20, 120 over a second area of the pieces of material 23 to be cut. The cutting torches 22 are lit and either the torch buggy 38 slowly travels along the main boom 36 or the retractable main boom 136 is moved with respect to the vertical support 58 to make lateral cuts in the material 23. These steps are repeated until all, of the material 23 in the second cutting bed 14 has been cut.

As the cutting of the material 23 in the second cutting bed 14 proceeds, the cut material 23 in the first cutting bed 12 is removed and more material 23 to be cut is located in the first cutting bed 12.

In this manner, cutting of the material may proceed in a continuous manner without interruptions to remove the cut material and supply new material. More material, whether measured in tons, inches per minute, or piece count, can be cut by having a continuous cutting sequence, using multiple torches operated with a single operator, and eliminating any interruption while loading and unloading of the material is taking place, while simultaneously providing better ergonomics, improved safety for the operator, and less emissions into the atmosphere.

At any time during the cutting of the material 23, the main boom 36 or the retractable main boom 136 may be adjusted in the vertical direction in order to adjust the distance between the torches 22 and the material 23 being cut or to account for differences in the thickness of the material 23 being cut.

The material that is cut may range in size from 0.25 inch thick plate to material that is 5 feet thick and may have a width from 20 feet up to the entire length of the travel way 16.

The pivoting torch cutting machine 10, 110 allows for 50% less longitudinal travel way as compared to a non-pivoting torch cutting machine and also allows material to be loaded and unloaded in the first cutting bed 12 while cutting in the second cutting bed 14, thus, reducing the waiting time for the crane to reload the cutting bed. The multiple torch design and cutting bed layout allows a single operator to continuously cut material of one piece or multiple pieces at the same time, multiplying his or her output over using a conventional hand torch method.

In addition, the cutting machine makes cutting material safer for the operator as he or she can operate the machine from a remote location away from the cutting flames. This design, if used properly, reduces the risk of cut material falling on his or her foot or other parts of the body. Also, the construction of the machine eliminates the need for the operator to carry heavy torch equipment, buggies, or hoses from one piece of material to be cut to another reducing the risk of muscle strain.

Constant torch buggy speed or a steady retraction rate of the retractable boom 136 and post-mix flame configuration along with proper oxy-fuel mixture produce considerably less smoke emissions over hand held torches or lance pipe processes. This feature helps the end user stay within the air permit guidelines without expensive fume extraction systems.

The torch cutting machine of the present invention reduces emissions in three ways. First, the use of torches with a post-mix tip allows for more complete burning of the fuel gasses. Second, the constant speed of the torch as it is moved with the buggy or moved through the retraction process of the retractable boom reduces emissions dramatically in relation to a hand held torch because of the controlled and constant speed. Third, the elevation of the cutting bed prevents the re-combustion of the slag from previous cuts reducing smoke emissions.

Although the invention has been described in detail for the purpose of illustration based on what is currently considered to be the most practical and preferred embodiments, it is to be understood that such detail is solely for that purpose and that the invention is not limited to the disclosed embodiments but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A torch cutting machine comprising:
   a longitudinal travel way;
   a main carriage adapted to travel along the travel way; and
   a boom assembly extending laterally from the main carriage in a direction perpendicular to the longitudinal travel way, the boom assembly comprising at least one cutting torch extending from a main boom,
   wherein the boom assembly rotates 180° with respect to the main carriage such that the main boom is transitionable from a first position in which the main boom extends laterally from a first side of the travel way to a second position in which the main boom extends laterally from a second opposite side of the travel way.

2. The torch cutting machine according to claim 1, wherein the main boom is fixed with respect to the main carriage and the at least one cutting torch is movable along the main boom.

3. The torch cutting machine according to claim 1, wherein the at least one torch is fixed with respect to the main boom and the main boom is movable with respect to the main carriage.

4. The torch cutting machine according to claim 1, wherein the torch cutting machine further comprises a vertical support extending from the main carriage, and at least one of the boom assembly and the main boom is movable along the vertical support.

5. The torch cutting machine according to claim 1, further comprising a torch boom extending perpendicular to the main boom, wherein the at least one cutting torch extends from the torch boom.

6. The torch cutting machine according to claim 5, wherein at least one of the distance that the plurality of torches extend from the torch beam and placement of the plurality of torches along the torch beam is adjustable.

7. The torch cutting machine according to claim 1, further comprising two cutting beds for holding material to be cut positioned on opposite sides of the travel way.

8. The torch cutting machine according to claim 7, wherein a support system for supporting material to be cut is provided in the cutting beds.

9. The torch cutting machine according to claim 8, wherein the support system comprises modular platforms.

10. A method of cutting metal material comprising:
    placing a boom of a torch cutting machine, the boom attached to a carriage adapted to travel along a longitudinal travel way and having at least one cutting torch extending therefrom, in a first position in which the boom extends laterally from a first side of the travel way over metal material in a first cutting bed;
    lighting the at least one torch and moving the at least one torch with respect to the metal material in the first cutting bed to cut the metal material;
    rotating the boom of the torch cutting machine 180° such that the boom assembly is transitioned from the first position to a second position in which the boom assembly extends laterally from a second opposite side of the travel way to place the boom over metal material in a second cutting bed; and lighting the at least one torch and moving the at least one torch with respect to the metal material in the second cutting bed to cut the metal material, wherein while the metal material in the second cutting bed is being cut, cut metal material is removed from the first cutting bed and new metal material to be cut is placed in the first cutting bed.

11. The method of cutting metal material according to claim 10, wherein the at least one torch is moved with respect to the metal material by moving the at least one torch along the boom.

12. The method of cutting metal material according to claim 10, wherein the at least one torch is moved with respect to the metal material by moving the boom with respect to the metal material.

13. The method of cutting metal material according to claim 10, wherein a height of the boom above the metal material is adjustable.

14. The method of cutting metal material according to claim 10, wherein the torch cutting machine further comprises a torch boom extending perpendicular to the boom and the at least one cutting torch extends from the torch boom.

15. The method of cutting metal material according to claim 10, wherein a support system for supporting material to be cut is provided in the cutting beds.

16. A method of cutting metal material according to claim 15, wherein the support system comprises modular platforms.

17. An apparatus for cutting metal material comprising:
a torch cutting machine comprising:
 a longitudinal travel way;
 a main carriage adapted to travel along the travel way; and
 a boom assembly extending laterally from the main carriage in a direction perpendicular to the longitudinal travel way and comprising at least one cutting torch extending from a main boom,
 wherein the boom assembly rotates 180° with respect to the main carriage such that the boom assembly is transitionable from a first position in which the boom assembly extends laterally from a first side of the travel way to a second position in which the boom assembly extends laterally from a second opposite side of the travel way; and
two cutting beds for holding metal material to be cut positioned on opposite sides of the travel way.

* * * * *